(12) United States Patent
Chen et al.

(10) Patent No.: US 12,038,640 B1
(45) Date of Patent: Jul. 16, 2024

(54) DISPLAY DEVICE AND ELECTRONIC DEVICE

(71) Applicant: HKC Corporation Limited, Guangdong (CN)

(72) Inventors: Qinglin Chen, Guangdong (CN); Baohong Kang, Guangdong (CN)

(73) Assignee: HKC CORPORATION LIMITED, Guangdong (CN)

(*) Notice: Subject to any disclaimer, the term of this patent is extended or adjusted under 35 U.S.C. 154(b) by 0 days.

(21) Appl. No.: 18/238,246

(22) Filed: Aug. 25, 2023

(30) Foreign Application Priority Data

Mar. 23, 2023 (CN) .......................... 202310287267.2

(51) Int. Cl.
| | | |
|---|---|---|
| *G02F 1/1333* | (2006.01) | |
| *F21V 8/00* | (2006.01) | |
| *G02F 1/1335* | (2006.01) | |
| *G02F 1/13357* | (2006.01) | |

(52) U.S. Cl.
CPC ..... *G02F 1/133382* (2013.01); *G02B 6/0023* (2013.01); *G02F 1/133314* (2021.01); *G02F 1/133553* (2013.01); *G02F 1/133615* (2013.01); *G02F 2203/11* (2013.01)

(58) Field of Classification Search
CPC ........... G02F 1/133382; G02F 2203/11; G02F 1/133314; G02F 1/133615; H05B 3/0033
See application file for complete search history.

(56) References Cited

U.S. PATENT DOCUMENTS

| | | | |
|---|---|---|---|
| 2008/0100791 A1* | 5/2008 | Chen | G02F 1/133382 349/161 |
| 2012/0313912 A1 | 12/2012 | Kanbayashi et al. | |
| 2017/0351138 A1* | 12/2017 | Han | G02F 1/133504 |
| 2020/0174178 A1 | 6/2020 | Qin et al. | |

(Continued)

FOREIGN PATENT DOCUMENTS

| | | |
|---|---|---|
| CN | 101452358 A | 6/2009 |
| CN | 102720994 A | 10/2012 |
| CN | 103453386 A | 12/2013 |

(Continued)

OTHER PUBLICATIONS

Chinese First Office Action dated Apr. 23, 2023 issued in CN 202310287267.2.

(Continued)

*Primary Examiner* — Jia X Pan
(74) *Attorney, Agent, or Firm* — Scully, Scott, Murphy & Presser, P.C.

(57) ABSTRACT

A display device and an electronic device are provided. The display device includes a back plate, a display panel, an optical film, a light guide strip, and an infrared light bead. The display panel is carried on the back plate and includes a liquid crystal layer. The optical film is disposed at one side of the display panel adjacent to the back plate. The light guide strip has a first light-incident surface and a light-exiting surface. The first light-incident surface is connected to the light-exiting surface in a bent manner. The infrared light bead is accommodated in the back plate. The infrared light bead is configured to emit infrared light. The infrared light bead is disposed close to the first light-incident surface of the light guide strip.

20 Claims, 11 Drawing Sheets

(56) References Cited

U.S. PATENT DOCUMENTS

2021/0341664 A1    11/2021    Xiao

FOREIGN PATENT DOCUMENTS

| CN | 204026538 U | | 12/2014 |
|---|---|---|---|
| CN | 105911761 A | | 8/2016 |
| CN | 108629223 A | | 10/2018 |
| CN | 109478236 A | | 3/2019 |
| CN | 110109215 A | | 8/2019 |
| CN | 111339860 A | | 6/2020 |
| CN | 112198720 A | | 1/2021 |
| CN | 212515284 U | | 2/2021 |
| CN | 113568220 A | | 10/2021 |
| CN | 114217472 A | | 3/2022 |
| CN | 216352273 U | | 4/2022 |
| CN | 114779390 A | | 7/2022 |
| CN | 115453790 A | | 12/2022 |
| CN | 116339004 A | * | 6/2023 |
| CN | 116560140 A | * | 8/2023 |
| JP | H0876109 A | | 3/1996 |
| JP | 2005024866 A | | 1/2005 |
| JP | 2013072985 A | | 4/2013 |
| KR | 20140067643 A | | 6/2014 |
| WO | 2013155676 A1 | | 10/2013 |
| WO | 2020077498 A1 | | 4/2020 |
| WO | 2021036586 A1 | | 3/2021 |
| WO | 2021163843 A1 | | 8/2021 |

OTHER PUBLICATIONS

Zhang, Ai-Hong et al., "Miniature design of high resolution optical system for infrared seeker", Journal of Applied Optics (Jul. 15, 2013), vol. 34, No. 4, pp. 564-569, Retrieved from: https://er.szlib.org.cn/rwt/331/https/NNYHGLUDN3WXTLUPMW4A/kcms2/article/abstract?v=3uoqlhG8C44YLTIOAiTRKgchrJ08w1e7xAZywCwkEEK-YrEz-skbNKb7fENFfa_g8ovUjdVPaNb7W_QfGxVaz8an7Hi-op2Y&uniplatform=NZKPT.

Ranjkesh, Amid et al., "Flexible, broadband, super-reflective infrared reflector based on cholesteric liquid crystal polymer", Solar Energy Materials and Solar Cells (May 24, 2021), Retrieved from: https://sci-hub.st/10.1016/j.solmat.2021.111137.

Decision to Grant dated May 15, 2023, issued in CN 202310287267.2.

* cited by examiner

DISPLAY DEVICE AND ELECTRONIC DEVICE

CROSS-REFERENCE TO RELATED APPLICATION

This application claims priority under 35 U.S.C. § 119(a) to Chinese Patent Application No. 202310287267.2, filed Mar. 23, 2023, the entire disclosure of which is incorporated herein by reference.

TECHNICAL FIELD

This disclosure relates to the field of display technology, and in particular to a display device and an electronic device.

BACKGROUND

At present, with improvement of living standards of people, various electronic products become increasingly popular in various fields such as office, scientific research, medical treatment, on-board, aerospace, etc., and the electronic products have gradually become indispensable parts of daily lives of people.

A normal operating temperature of liquid crystal in a display screen of the electronic product usually ranges from 0° C. to 50° C. A liquid crystal material is very sensitive to a temperature of an environment. When the temperature is lower, liquid crystal molecules flip slower, which means that a response time of the screen becomes longer. In severe low-temperature conditions, such as an environment of tens of degrees below zero in northern winter and some specifical low-temperature operating environments, rotation of the liquid crystal in the display screen of the electronic product may be seriously affected, such that the electronic device is unable to be turned on, the display screen is not bright, or the display screen is abnormal. As a result, the display screen is prone to optical losses such as long response time, afterimage, and contrast under an influence of a low temperature, and operation of the electronic product in a low-temperature environment is limited.

SUMMARY

In a first aspect, a display device is provided in the present disclosure. The display device includes a back plate, a display panel, an optical film, a light guide strip, and an infrared light bead. The display panel is carried on the back plate and includes a liquid crystal layer. The optical film is disposed at one side of the display panel adjacent to the back plate. The light guide strip has a first light-incident surface and a light-exiting surface. The first light-incident surface is connected to the light-exiting surface in a bent manner. The infrared light bead is accommodated in the back plate. The infrared light bead is configured to emit infrared light. The infrared light bead is disposed close to the first light-incident surface of the light guide strip. The infrared light emitted by the infrared light bead enters the light guide strip via the first light-incident surface of the light guide strip, and exits the light guide strip via the light-exiting surface. The infrared light emitted from the light-exiting surface at least partially avoids the optical film and is incident on the liquid crystal layer of the display panel, to heat the liquid crystal layer of the display panel.

In a second aspect, an electronic device is further provided in the present disclosure. The electronic device includes a housing and a display device. The display device includes a back plate, a display panel, an optical film, a light guide strip, and an infrared light bead. The display panel is carried on the back plate and includes a liquid crystal layer. The optical film is disposed at one side of the display panel adjacent to the back plate. The light guide strip has a first light-incident surface and a light-exiting surface. The first light-incident surface is connected to the light-exiting surface in a bent manner. The infrared light bead is accommodated in the back plate. The infrared light bead is configured to emit infrared light. The infrared light bead is disposed close to the first light-incident surface of the light guide strip. The infrared light emitted by the infrared light bead enters the light guide strip via the first light-incident surface of the light guide strip, and exits the light guide strip via the light-exiting surface. The infrared light emitted from the light-exiting surface at least partially avoids the optical film and is incident on the liquid crystal layer of the display panel, to heat the liquid crystal layer of the display panel. The housing is configured to accommodate the display device.

BRIEF DESCRIPTION OF THE DRAWINGS

To explain technical solutions in implementations of the present disclosure or the related art more clearly, the following will give a brief introduction to accompanying drawings which are needed to be used in description of implementations or the related art. Apparently, the accompanying drawings in the following description are some implementations of the present disclosure. For those of ordinary skill in the art, other accompanying drawings can be obtained according to these accompanying drawings without creative efforts.

REFERENCE SIGNS 1-electronic device, 10-display device, 20-housing, 30-sensor, 40-control chip, 11-back plate, 12-display panel, 13-optical film, 14-light guide strip, 15-infrared light bead, 16-reflective strip, 17-visible light bead, 111-body portion, 112-frame portion, 121-liquid crystal layer, 141-first light-incident surface, 142-light-exiting surface, 143-second light-incident surface, 144-bottom surface, 1121-first accommodating groove, 1122-second accommodating groove, 1123-first frame sub-portion, 1124-second frame sub-portion, 1125-connecting portion, 112a-first end-surface, 112b-second end-surface, 112c-connecting surface.

DETAILED DESCRIPTION

Technical solutions of implementations of the present disclosure will be described clearly and completely with reference to accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

Terms "first", "second", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, a method, a system, a product, or a device including a series of operations or units is not limited to the listed operations or units, it can optionally include other operations or units that are not listed; alternatively, other operations or units inherent to the process, the method, the product, or the device can be included either.

A term "implementation" referred to herein means that a particular feature, structure, or characteristic described in conjunction with implementations may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

Figure 1:
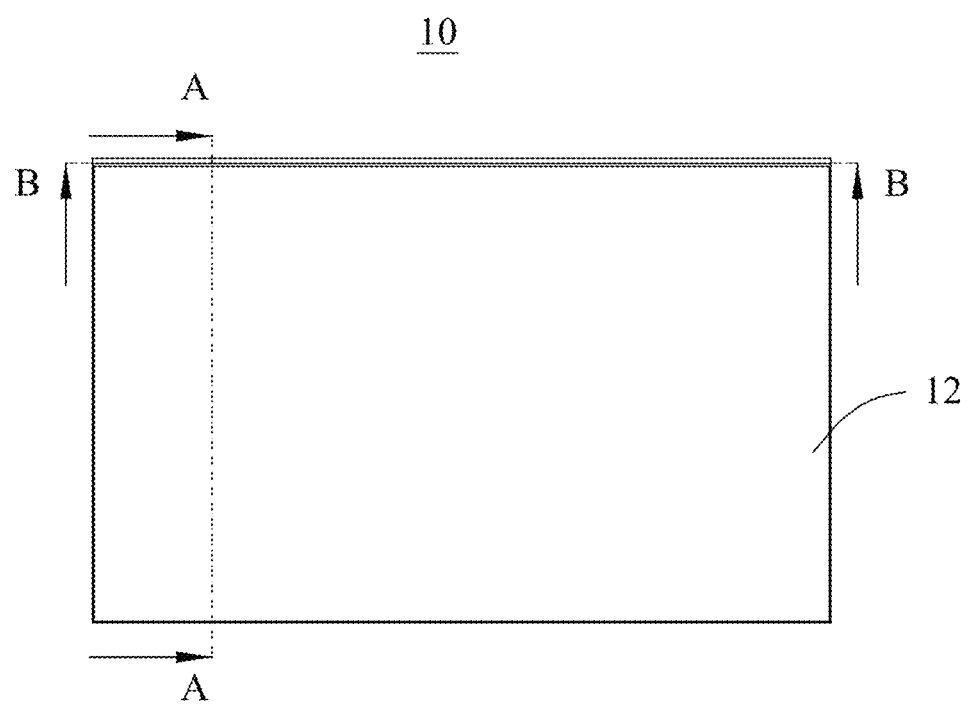
FIG. 1 is a schematic diagram of a display device in implementations of the present disclosure.
Figure 2:
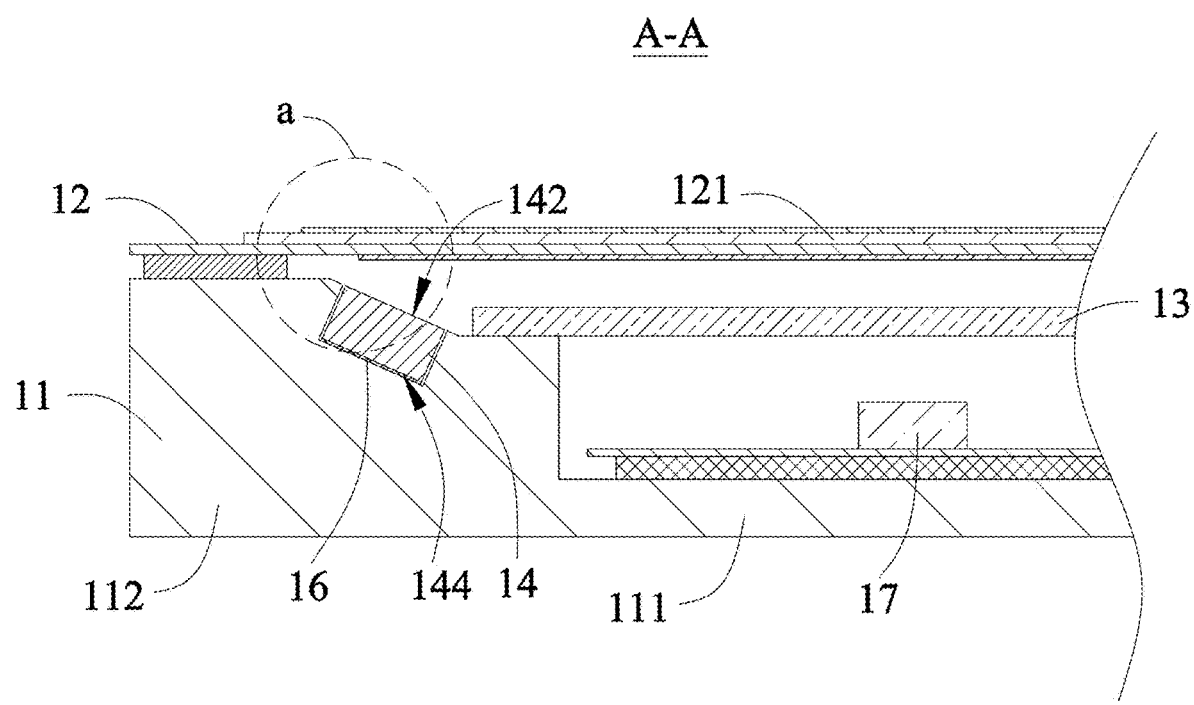
FIG. 2 is a partial schematic cross-sectional structural diagram of the display device provided in FIG. 1 taken along line A-A.
Figure 3:
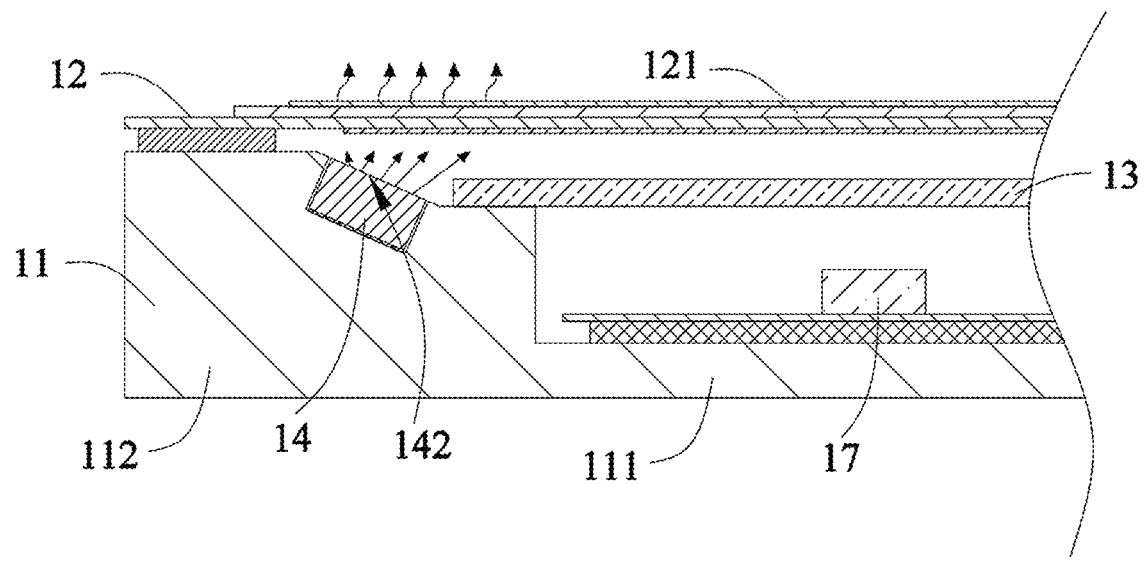
FIG. 3 is a schematic diagram of an infrared light path of a display device in implementations of the present disclosure.
Figure 5:
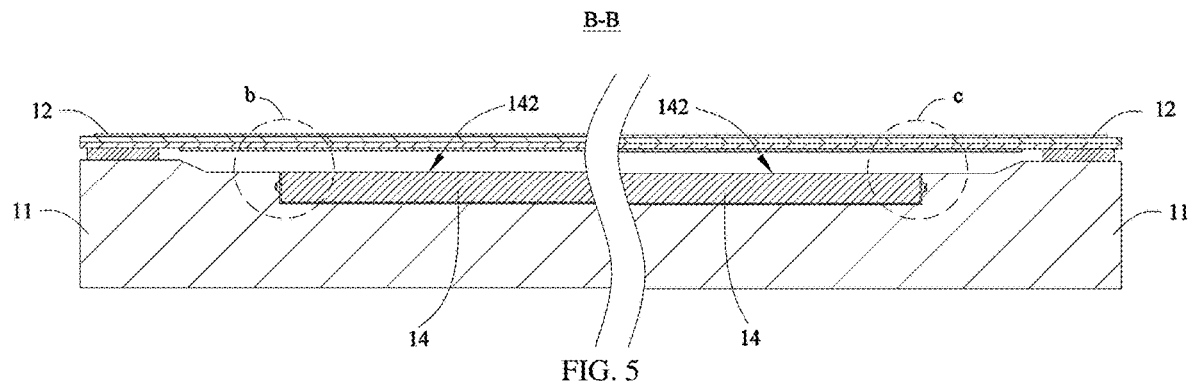
FIG. 5 is a partial schematic cross-sectional structural diagram of the display device provided in FIG. 1 taken along line B-B.
Figure 6:
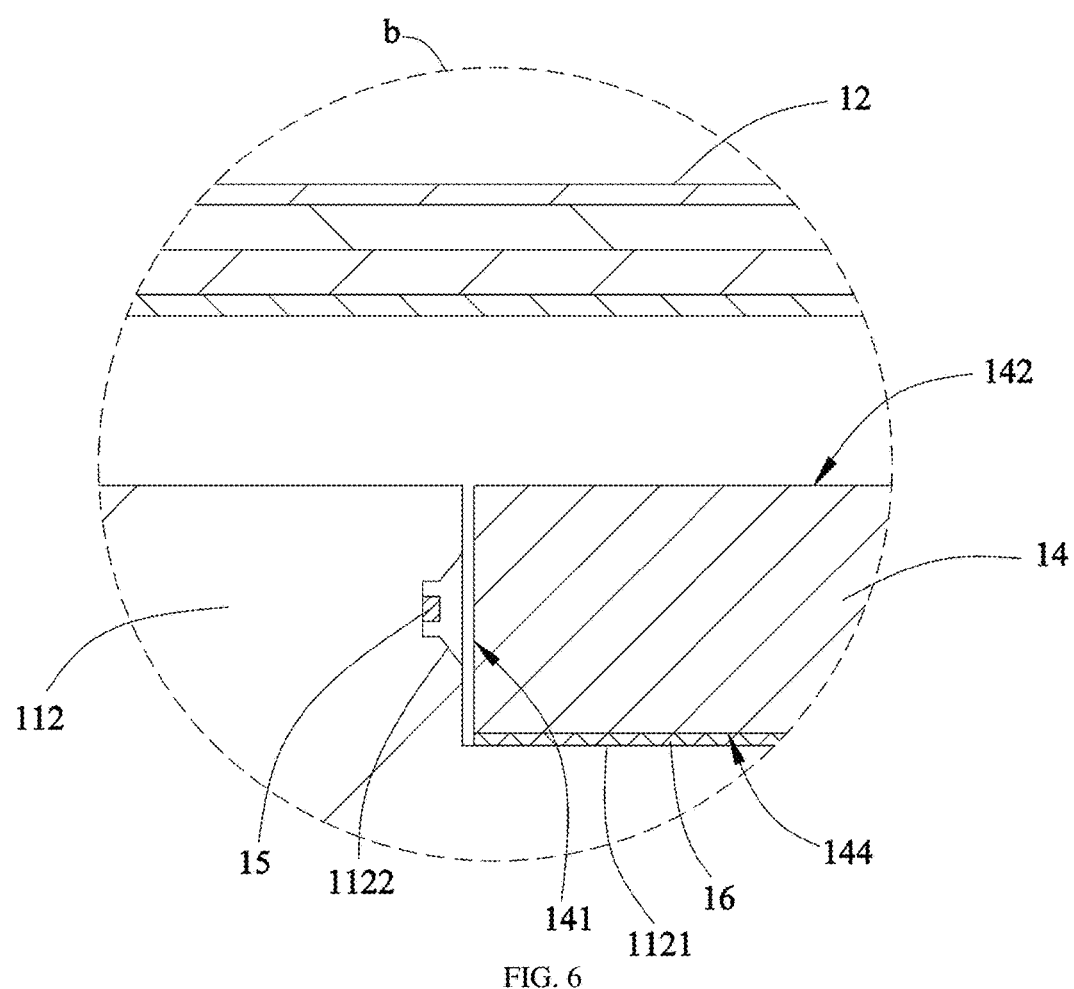
FIG. 6 is a partial enlarged schematic structural diagram of the display device provided in FIG. 5.

Referring to FIG. 1, FIG. 2, FIG. 3, FIG. 5, and FIG. 6, FIG. 1 is a schematic diagram of a display device in implementations of the present disclosure, FIG. 2 is a partial schematic cross-sectional structural diagram of the display device provided in FIG. 1 taken along line A-A, FIG. 3 is a schematic diagram of an infrared light path of a display device in implementations of the present disclosure, FIG. 5 is a partial schematic cross-sectional structural diagram of the display device provided in FIG. 1 taken along line B-B, and FIG. 6 is a partial enlarged schematic structural diagram of the display device provided in FIG. 5. A display device 10 is provided in the present disclosure. The display device 10 includes a back plate 11, a display panel 12, an optical film 13, a light guide strip 14, and an infrared light bead 15. The display panel 12 is carried on the back plate 11 and includes a liquid crystal layer 121. The optical film 13 is disposed at one side of the display panel 12 adjacent to the back plate 11. The light guide strip 14 has a first light-incident surface 141 and a light-exiting surface 142. The first light-incident surface 141 is connected to the light-exiting surface 142 in a bent manner. The infrared light bead 15 is accommodated in the back plate 11. The infrared light bead 15 is configured to emit infrared light. The infrared light bead 15 is disposed close to the first light-incident surface 141 of the light guide strip 14. The infrared light emitted by the infrared light bead 15 enters the light guide strip 14 via the first light-incident surface 141 of the light guide strip 14, and exits the light guide strip 14 via the light-exiting surface 142. The infrared light emitted from the light-exiting surface 142 at least partially avoids the optical film 13 and is incident on the liquid crystal layer 121 of the display panel 12, to heat the liquid crystal layer 121 of the display panel 12.

The display device 10 may be, but is not limited to, a Thin Film Transistor Liquid Crystal Display (TFT-LCD) device 10, or a Mini Light Emitting Diode (Mini LED) display device 10, or a Micro Light Emitting Diode (Micro LED) display device 10, etc. It can be understood that the display device 10 may also be a display device 10 with other frameworks.

The display panel 12 is carried on the back plate 11. The display panel 12 and the back panel 11 may be, but is not limited to, fixed by a foam tape. The display panel 12 may include, but is not limited to, the liquid crystal layer 121, a substrate, and the like. Liquid crystal in the liquid crystal layer 121 is control by an electric field to rotate, such that the display panel 12 displays an image.

The optical film 13 is disposed at one side of the display panel 12 adjacent to the back plate 11. The optical film 13 may be, but is not limited to, carried on the back plate 11.

The display device 10 may further include, but is not limited to, a visible light bead 17. The visible light bead 17 may be, but is not limited to, a Light Emitting Diode (LED) bead, a Mini LED bead, or a Micro LED bead. The visible light beads 17 is able to emit visible light and provide a light source for the display panel 12.

A manner of the visible light bead 17 providing a light source for the display device 10 may be, but not limited to, a bottom light-incident type or a side light-incident type. In this implementation, for example, the visible light bead 17 is of the bottom light-incident type. The visible light bead 17 can directly emit visible light to the optical film 13, and is incident on the display panel 12 through the optical film 13, such that the visible light can be uniformly transmitted to the entire display panel 12, and details of a display image of the display panel 12 are more delicate and vivid.

A material of the light guide strip 14 may include, but is not limited to, Polycarbonate (PC), Polymethyl Methacrylate (PMMA), or silica gel. It can be understood that the light guide strip 14 may also be made of other materials having an effect of diffusing infrared light. The display device 10 provided in this implementation should not be limited by the material of the light guide strip 14.

A shape of the light guide strip 14 may be, but is not limited to, an elongated strip, or like the elongated strip.

The light guide strip 14 may have, but is not limited to, the first light-incident surface 141 and the light-exiting surface 142. The first light-incident surface 141 may be, but is not limited to, a flat surface, a curved surface, or other irregular surface. The light-exiting surface 142 may be, but is not limited to, a flat surface, a curved surface, or other irregular surface. A bent angle between the first light-incident surface 141 and the light-exiting surface 142 may be, but is not limited to, 90°, about 90°, or any other angles.

The infrared light bead 15 is accommodated in the back plate 11. In one implementation, the infrared light bead 15 may be, but is not limited to, disposed in a groove of the back plate 11. The infrared light emitted by the infrared light bead 15 may be used to heat the liquid crystal layer 121 of the display panel 12. In one implementation, the infrared light is also referred to as infrared radiation. The infrared light is an electromagnetic wave in an infrared wave band of 0.76-1000 μm and between visible light and a microwave. The infrared light is invisible light with a lower frequency than that red light, has an obvious thermal effect, and can heat a surrounding object. When an ambient temperature is too low, rotation of the liquid crystal in the liquid crystal layer 121 will be seriously affected. A radiation wavenumber from 2700 cm$^{-1}$ to 3100 cm$^{-1}$ (corresponding to a wavelength ranging from 2325 nm to 2026 nm) of the infrared light is a strong absorption band for the liquid crystal layer 121. In this implementation of the present disclosure, the infrared light bead 15 emits infrared light that may be, but is not limited to, a radiation wavenumber ranging from 2700 cm$^{-1}$ to 3100 cm$^{-1}$ (corresponding to a wavelength ranging from 2325 nm to 2026 nm), and the infrared light is used to heat the liquid crystal layer 121 of the display panel 12, such that the display panel 12 can also operate normally in the low-temperature environment.

The infrared light bead 15 is disposed close to the first light-incident surface 141 of the light guide strip 14. In one implementation, a surface of the infrared light bead 15 emitting the infrared light may, but is not limited to, directly face or partially face the first light-incident surface 141. The infrared light emitted by the infrared light bead 15 may enter the light guide strip 14 via the first light-incident surface 141 of the light guide strip 14, and exit the light guide strip 14 via the light-exiting surface 142. The infrared light emitted by the infrared light bead 15 is diffused by the light guide strip 14, such that the infrared light can be emitted in a wider range. In the display device 10, only a small number of infrared light beads 15 can be disposed, such that sufficient infrared light can be incident on the liquid crystal layer 121 of the display panel 12 to efficiently heat the display panel 12. In addition, the light guide strip 14 can also convert the infrared light emitted by the infrared light bead 15 into a uniform light source and provide the uniform light source for the display panel 12, such that the liquid crystal layer 121 of the display panel 12 can be heated uniformly.

The light-exiting surface 142 of the light guide strip 14 may be, but is not limited to, disposed at a periphery of the optical film 13, and the light-exiting surface 142 of the light guide strip 14 may be, but is not limited to, spaced apart from the optical film 13. The infrared light emitted from the light-exiting surface 142 may, but is not limited to, partially avoid or completely avoid the optical film 13 to be incident on the liquid crystal layer 121 of the display panel 12. In one implementation, after the infrared light exits the light guide strip 14 via the light-exiting surface 142 of the light guide strip 14, the infrared light is directly incident on the display panel 12, such that the loss of the infrared light is reduced. Therefore, with the same number of infrared light beads 15 and the same power of the infrared light beads 15, the display panel 12 can realize a stronger heating effect, and the liquid crystal layer 121 of the display panel 12 can also realize rapid temperature rise even in the low-temperature environment.

In summary, the display device 10 provided in the present disclosure includes the back plate 11, the display panel 12, the optical film 13, the light guide strip 14, and the infrared light bead 15. The infrared light bead 15 is configured to emit the infrared light. The infrared light bead 15 is disposed close to the first light-incident surface 141 of the light guide strip 14. The infrared light emitted by the infrared light bead 15 enters the light guide strip 14 via the first light-incident surface 141 of the light guide strip 14, and exits the light guide strip 14 via the light-exiting surface 142. The infrared light emitted by the infrared light bead 15 is diffused by the light guide strip 14, such that the infrared light is emitted in a wider range. In the display device 10, only a small number of infrared light beads 15 can be disposed, such that sufficient infrared light can be incident on the liquid crystal layer 121 of the display panel 12 to effectively heat the display panel 12. In addition, the light guide strip 14 can also convert the infrared light emitted by the infrared light bead 15 into a uniform light source and provide the uniform light source for the display panel 12, such that the liquid crystal layer 121 of the display panel 12 can be heated uniformly. The infrared light emitted by the light-exiting surface 142 at least partially avoids the optical film 13 and is incident on the liquid crystal layer 121 of the display panel 12, to heat the liquid crystal layer 121 of the display panel 12, such that loss of the infrared light is reduced. Therefore, with the same number of infrared light beads 15 and the same power of the infrared light beads 15, the display panel 12 can realize the stronger heating effect, and the liquid crystal layer 121 of the display panel 12 can also realize the rapid temperature rise even in the low-temperature environment.

Figure 4:
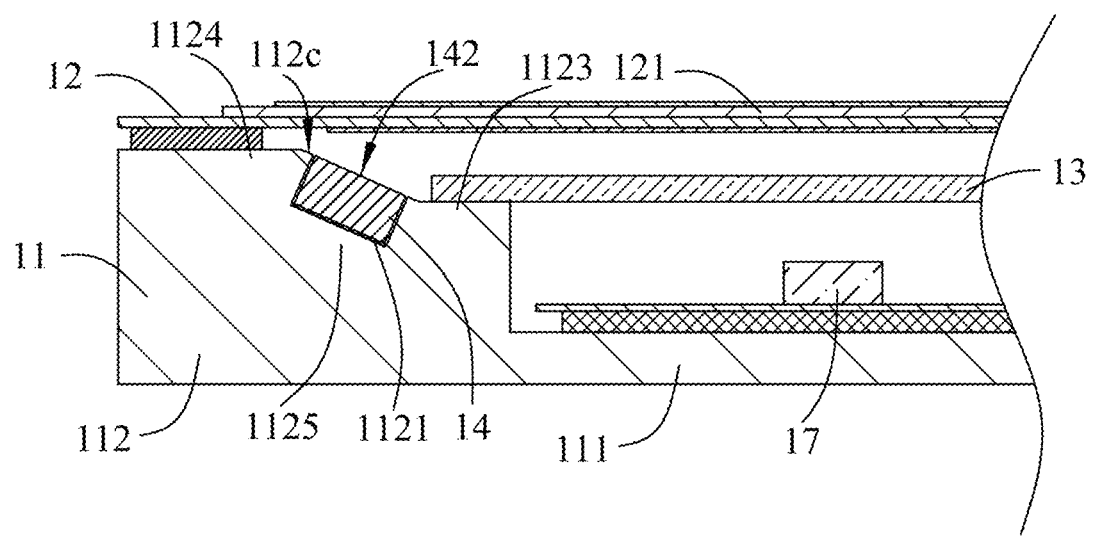
FIG. 4 is a partial schematic cross-sectional structural diagram of a display device in an implementation of the present disclosure taken along line A-A.

Referring to FIG. 4, FIG. 5, and FIG. 6, FIG. 4 is a partial schematic cross-sectional structural diagram of a display device in an implementation of the present disclosure taken along line A-A. The back plate 11 includes a body portion 111 and a frame portion 112. The frame portion 112 is connected to a periphery of the body portion 111 in a bent manner. The frame portion 112 defines a first accommodating groove 1121 and a second accommodating groove 1122 communicating with the first accommodating groove 1121. The light guide strip 14 is disposed in the first accommodating groove 1121. The infrared light bead 15 is disposed in the second accommodating groove 1122.

The body portion 111 may be, but is not limited to, integrated with the frame portion 112. The body portion 111 may be, but is not limited to, configured to carry the visible light bead 17.

A bent angle between the frame portion 112 and the body portion 111 may be, but is not limited to, 90°, about 90°, or any other angles.

The frame portion 112 may be, but is not limited to, configured to accommodate the light guide strip 14, and the light-exiting surface 142 of the light guide strip 14 may be, but is not limited to, exposed beyond the frame portion 112. The light guide strip 114 may be, but is not limited to be, partially disposed in, or all disposed in the first accommodating groove 1121. The frame portion 112 defines the first accommodating groove 1121 at a sidewall of the frame portion 112, and the sidewall of the frame portion 112 may be, but is not limited to, configured to block or partially block the infrared light exiting via a peripheral side surface of the light guide strip 14, such that more infrared light exits via the light-exiting surface 142, thereby improving a utilization efficiency of the infrared light.

In other implementations of the present disclosure, the frame portion 112 defines the first accommodating groove 1121 at the sidewall of the frame portion 112, and the sidewall of the frame portion 112 may be, but is not limited to, coated with a first reflective-film-layer. The first reflective-film-layer may be, but not limited to, made of a material capable of reflecting infrared light, such as gold, aluminum, titanium dioxide, or other materials capable of reflecting infrared light. With the aid of the first reflective-film-layer, the infrared light can be better reflected, such that the utilization efficiency of the infrared light can be further improved.

The second accommodating groove 1122 may be, but is not limited to, be configured to accommodate the infrared light bead 15, and the second accommodating groove 1122 may be, but is not limited to, communicate with the first accommodating groove 1121, such that the infrared light emitted by the infrared light bead 15 can be incident on the light guide strip 14 disposed in the second accommodating groove 1122. The infrared light bead 15 is accommodated in the second accommodating groove 1122, such that waste of infrared light can be further reduced. In one implementation, when the infrared light is emitted to a side wall of the frame portion 112 defining the second accommodating groove 1122, the infrared light may be, but is not limited to, reflected to the light guide strip 114, such that the waste of the infrared light can be reduced.

In other implementations of the present disclosure, a sidewall of the frame portion 112 defines the second accommodating groove 1122 may be, but is not limited to, coated with a second reflective-film-layer. The second reflective-film-layer may be, but not limited to, made of a material capable of reflecting infrared light, such as gold, aluminum, or titanium dioxide, or other materials capable of reflecting infrared light. With the aid of the second reflective-film-layer, the infrared light can be better reflected, such that the utilization efficiency of the infrared light can be further improved.

Referring to FIG. 4 again, the frame portion 112 includes a first frame sub-portion 1123, a second frame sub-portion 1124, and a connecting portion 1125. The first frame sub-portion 1123 is configured to carry the optical film 113. The second frame sub-portion 1124 is configured to carry the display panel 12. The connecting portion 1125 is connected between the first frame sub-portion 1123 and the second frame sub-portion 1124. The connecting portion 1125 has a connecting surface 112c away from the body portion 111. The connecting surface 112c is inclined in a direction away from a periphery of the display panel 12. The first accommodating groove 1121 is defined in the connecting portion 1125. An opening of the first accommodating groove 1121 is located on the connecting surface 112c.

The first frame sub-portion 1123, the second frame sub-portion 1124, and the connecting portion 1125 may be, but are not limited to, integrated with one another. The first frame sub-portion 1123 may be, but is not limited to, configured to carry the optical film 113. In one implementation, the first frame sub-portion 1123 may be, but is not limited to, configured to carry a peripheral part of the optical film 113.

The second frame sub-portion 1124 may be, but is not limited to, configured to carry the display panel 12. In one implementation, the second frame sub-portion 1124 may be, but is not limited to, configured to carry a peripheral part of the display panel 12. The display panel 12 and the second frame sub-portion 1124 may be, but are not limited to, connected through a foam tape, to enhance a fixing effect on the display panel 12.

The connecting portion 1125 is connected between the first frame sub-portion 1123 and the second frame sub-portion 1124. In other words, one end of the connecting portion 1125 may be, but is not limited to, connected to the first frame sub-portion 1123 in a bent manner, and the other end of the connecting portion 1125 may be, but is not limited to, connected to the second frame sub-portion 1124 in a bent manner. The connecting portion 1125 may be, but is not limited to, spaced apart from a peripheral side surface of the optical film 113. The connecting portion 1125 has the connecting surface 112c away from the body portion 111. An orthographic projection of the display panel 12 on the frame portion 112 may, but is not limited to, cover the connecting surface 112c. The connecting surface 112c may be, but is not limited to, inclined in the direction away from the periphery of the display panel 12. In one implementation, the connecting surface 112c may be, but is not limited to, spaced apart from the display panel 12. A distance between the connecting surface 112c and the display panel 12 may, but is not limited to, gradually increase from the periphery of the display panel 12 to the center of the display panel 12. In other words, the connecting surface 112c and the display panel 12 defines an angle therebetween, and the angle between the connecting surface 112c and the display panel 12 may be, but is not limited to, 15°, 20°, 25°, 30°, or the like.

After the first accommodating groove 1121 is accommodated in the light guide strip 114, light emitted from the light-exiting surface 142 of the light guide strip 114 may be, but is not limited to, emitted from the opening of the first accommodating groove 1121. The first accommodating groove 1121 may be, but is not limited to, defined in the connecting portion 1125. The opening of the first accommodating groove 1121 may be, but is not limited to, located on the connecting surface 112c, such that the infrared light emitted from the light-exiting surface 142 of the light guide strip 14 can be emitted from the opening of the first accommodating groove 1121 to the display panel 12. In addition, since there is the angle between the connecting surface 112c and the display panel 12, the infrared light can be more comprehensively emitted to the display panel 12, such that the liquid crystal layer 121 of the display panel 12 be comprehensively and uniformly heated.

Figure 7:
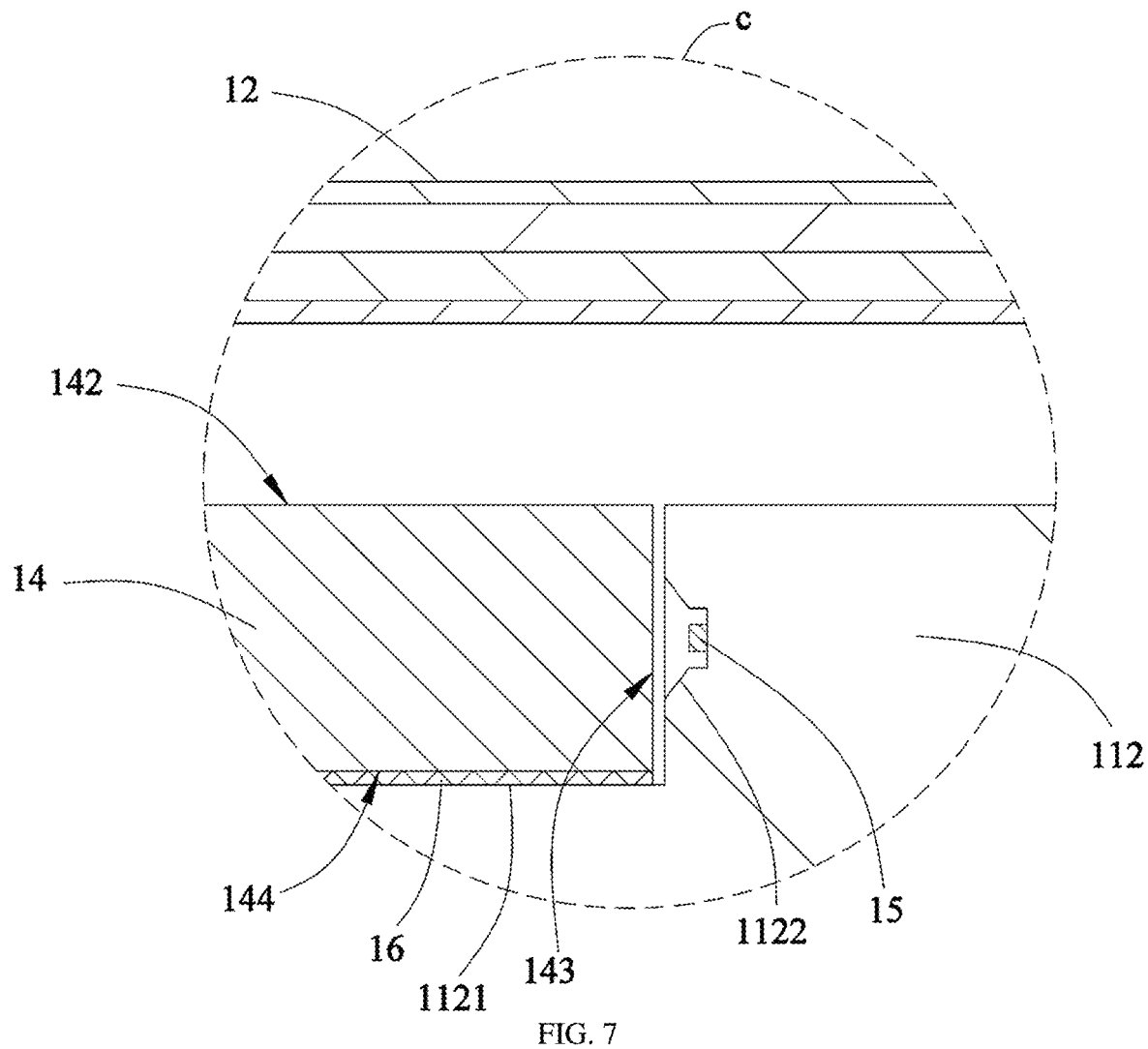
FIG. 7 is a partial enlarged schematic structural diagram of a display device in an implementation of the present disclosure.

Referring to FIG. 5, FIG. 6, and FIG. 7, FIG. 7 is a partial enlarged schematic structural diagram of a display device in an implementation of the present disclosure. The light guide strip 14 further has a second light-incident surface 143. The second light-incident surface 143 is connected to the light-exiting surface 142 in a bent manner, and is opposite to the first light-incident surface 141. The display device 10 includes multiple infrared light beads 15. Some infrared light beads 15 in the multiple infrared light beads 15 are disposed close to the first light-incident surface 141, and infrared light emitted by said some infrared light beads 15 enters the light guide strip 14 via the first light-incident surface 141. The other infrared light beads 15 in the multiple infrared light beads 15 are disposed close to the second light-incident surface 143, and infrared light emitted by the other infrared light beads 15 enters the light guide strip 14 via the second light-incident surface 143.

The second light-incident surface 143 may be, but is not limited to, a flat surface, a curved surface, or other irregular surfaces. The second light-incident surface 143 is connected to the light-exiting surface 142 in a bent manner. A bent angle between the second light-incident surface 143 and the light-exiting surface 142 may be, but is not limited to, 900 or about 90°.

The display device 10 includes the multiple infrared light beads 15. The number of infrared light beads 15 may be, but is not limited to, two, three, four, five, six, or the like. It can be understood that the number of the infrared light beads 15 can also be adjusted according to actual application requirements of the display device 10, and should not be construed as limitation to the display device 10 provided in this implementation.

Said some infrared light beads in the multiple infrared light beads 15 are disposed close to the first light-incident surface 141, and the infrared light emitted by said some infrared light beads enters the light guide strip 14 via the first light-incident surface 141. The number of said some infrared light beads 15 may be, but is not limited to, one, two, three, or the like. In this implementation, for example, one infrared light bead 15 is disposed close to the first light-incident surface 141. On condition that only one infrared light bead 15 is disposed close to the first light-incident surface 141, due to a diffusion effect of the light guide strip 14, the liquid crystal layer 121 of the display panel 12 is still heated well, thereby greatly reducing costs.

The other infrared light beads 15 in the multiple infrared light beads 15 are disposed close to the second light-incident surface 143, and the infrared light emitted by the other infrared light beads 15 enters the light guide strip 14 via the second light-incident surface 143. The number of the other infrared light beads 15 may be, but is not limited to, one, two, three, or the like. In this implementation, for example, one infrared light bead 15 is disposed close to the second light-incident surface 143. On condition that only one infrared light bead 15 is disposed close to the second light-incident surface 142, due to the diffusion effect of the light guide strip 14, the liquid crystal layer 121 of the display panel 12 is still heated well, thereby greatly reducing costs.

In one implementation, the number of the infrared light beads 15 at two sides of the light guide strip 14 may be, but is not limited to, equal, such that the light guide strip 14 has a uniform light-exiting effect.

In this implementation, the infrared light bead 15 is disposed at each of the two sides of the light guide strip 14, such that infrared light emitted by the light guide strip 14 is more uniform and sufficient, thereby enhancing a heating effect on the display panel 12, and enabling the display panel 12 to rapidly rise in temperature.

Figure 9:
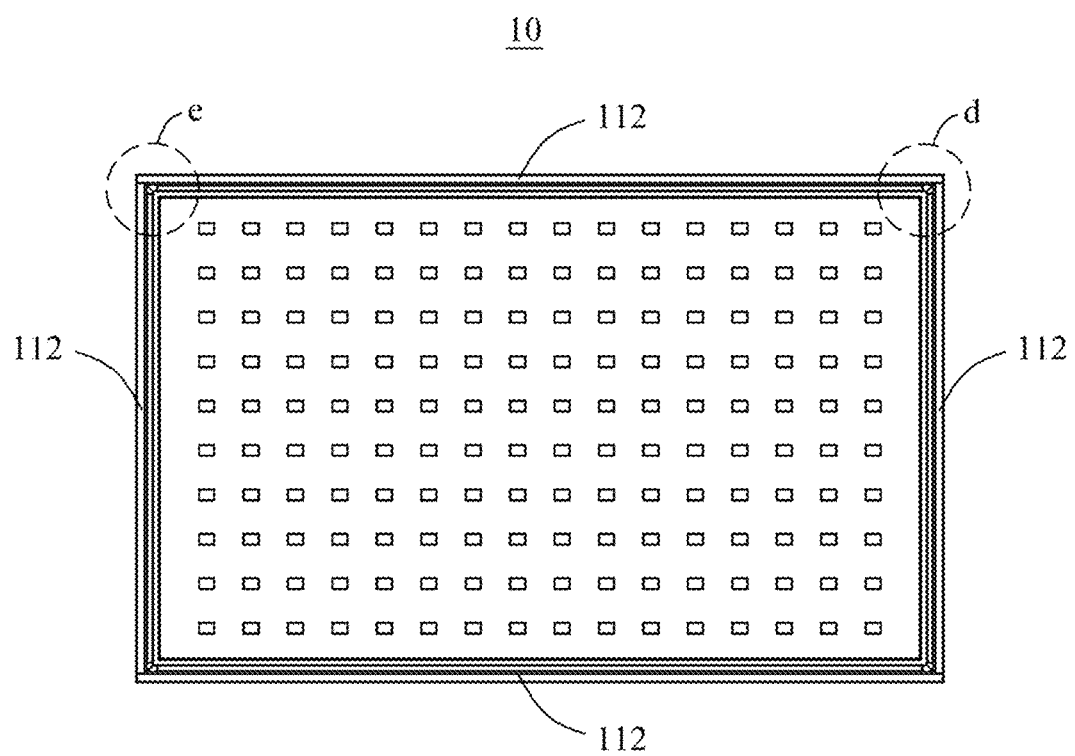
FIG. 9 is a partial schematic structural top view of a partial structure of a display device in implementations of the present disclosure.
Figure 10:
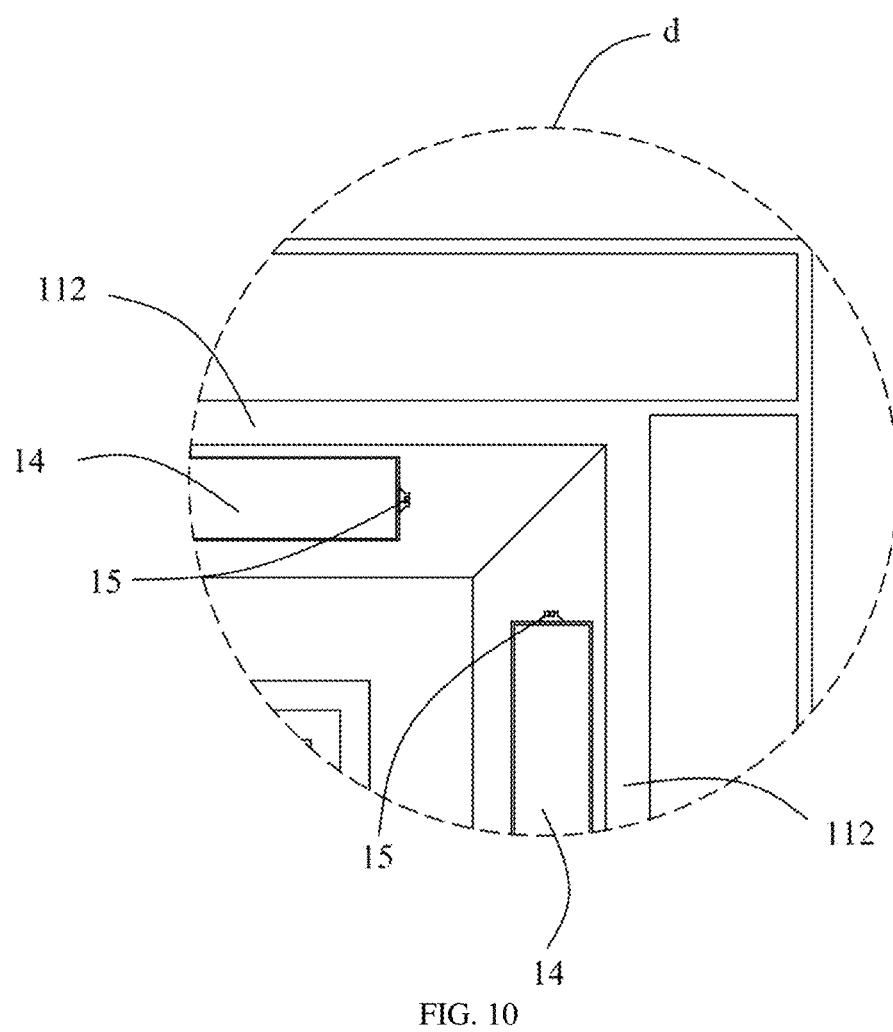
FIG. 10 is a partial enlarged schematic structural diagram of the display device provided in FIG. 9.
Figure 11:
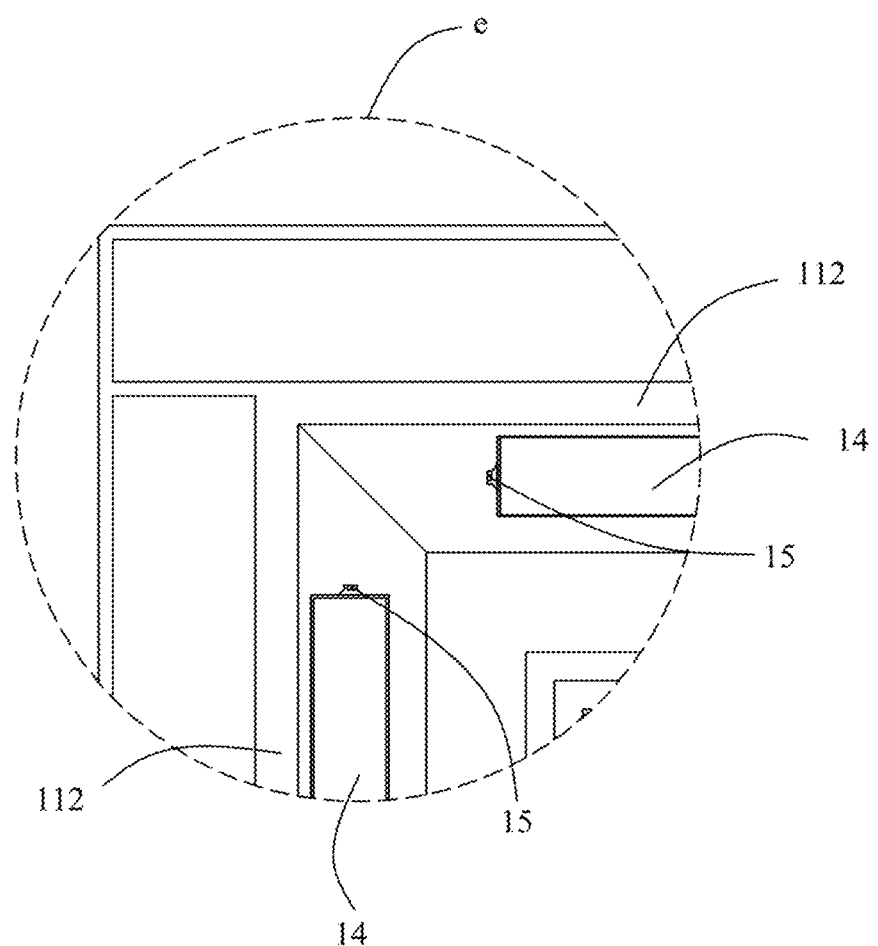
FIG. 11 is a partial enlarged schematic structural diagram of a display device in another implementation of the present disclosure.

Referring to FIG. 9, FIG. 10, and FIG. 11, FIG. 9 is a partial schematic structural top view of a partial structure of a display device in implementations of the present disclosure, FIG. 10 is a partial enlarged schematic structural diagram of the display device provided in FIG. 9, and FIG. 11 is a partial enlarged schematic structural diagram of a display device in another implementation of the present disclosure. The back plate 11 includes multiple frame portions 112. The display device 10 includes multiple light guide strips 14. The multiple frame portions 112 each are at least provided with one of the multiple light guide strips 14 and two of the multiple infrared light beads 15 correspondingly. One of the two infrared light beads 15 is disposed close to the first light-incident surface 141 of the light guide strip 14, and the other of the two infrared light beads 15 is disposed close to the second light-incident surface 143 of the light guide strip 14.

The back plate 11 may include, but is not limited to, multiple frame portions 112. The number of frame portions 112 may be, but is not limited to, one, two, three, four, or the like. In this implementation, for example, the number of the frame portions 112 is four, the four frame portions 112 may be, but are not limited to, sequentially connected in a bent manner, and the four frame portions 112 are disposed corresponding to four peripheral side surfaces of the display panel 12 respectively. In other words, the four frame portions 112 may be, but are not limited to, disposed close to different peripheral side surfaces of the display panel 12 respectively, and are configured to carry the display panel 12 together.

The number of light guide strips 14 may be, but is not limited to, two, three, four, or more, and the like. It can be understood that the number of the light guide strips 14 should not be construed as a limitation to the display device 10 provided in this implementation. In one implementation of the present disclosure, for example, the number of the light guide strips 14 is four. The four light guide strips 14 may be, but not limited to, disposed in different frame portions 112 respectively, that is, the four light guide strips 14 are disposed close to different peripheral side surfaces of the display panel 12 respectively.

The number of the infrared light beads 15 may be, but is not limited to, two, three, four, or more. It can be understood that the number of the infrared light beads 15 should not be construed as a limitation to the display device 10 provided in this implementation. In one implementation of the present disclosure, for example, the number of the infrared light beads 15 is eight, that is, the four frame portions 112 each are provided with one light guide strip 14 and two infrared light beads 15 respectively. In addition, in each frame portion 112, it may be, but is not limited to, that one infrared light bead 15 is disposed close to the first light-incident surface 141 of the light guide strip 14, and another infrared light bead 15 is disposed close to the second light-incident surface 143 of the light guide strip 14.

In the display device 10 provided in this implementation, the light guide strips 14 are disposed in the multiple frame portions 112 around the display panel 12. In addition to convenient and simple installation, a utilization effect of the infrared light is greatly improved, and the display panel 12 can be uniformly and efficiently heated, such that the display panel 12 is more comprehensively and completely heated.

Figure 8:
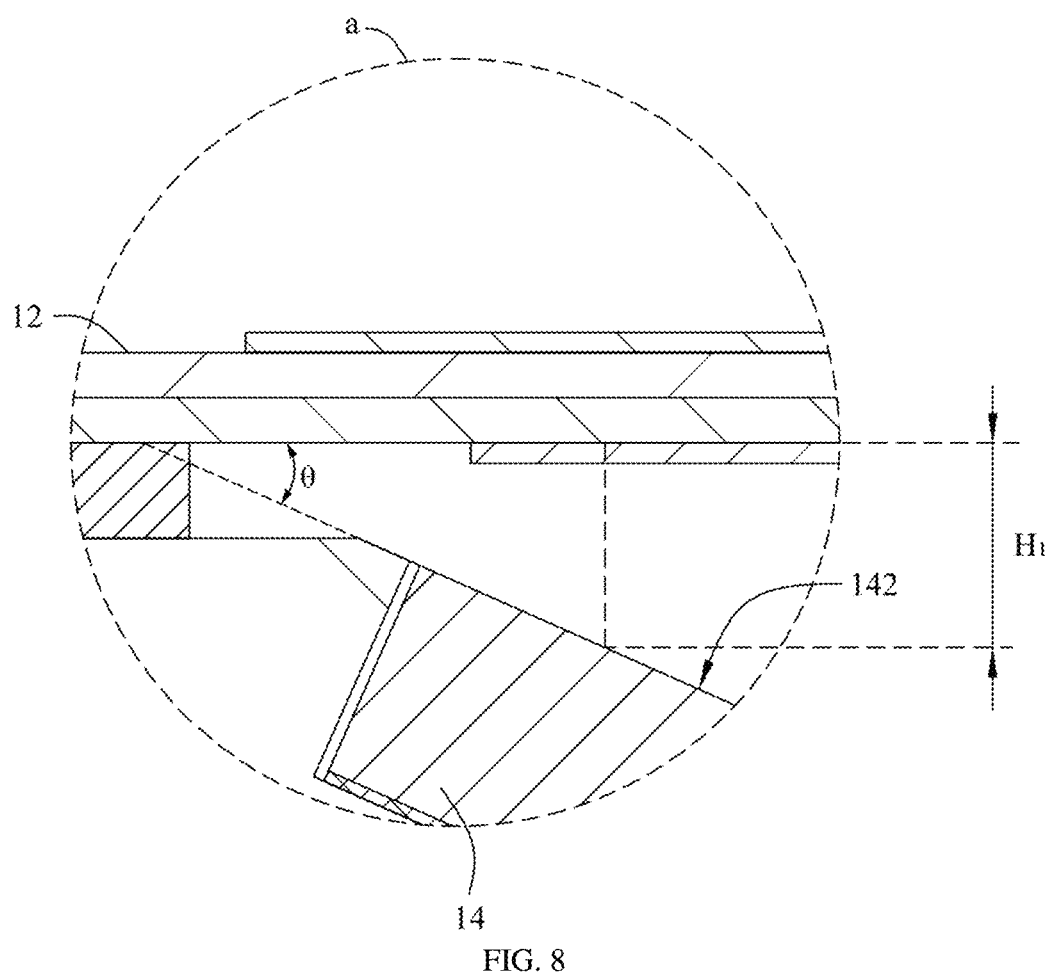
FIG. 8 is a partial enlarged schematic structural diagram of the display device provided in FIG. 2.

Referring to FIG. 8, FIG. 8 is a partial enlarged schematic structural diagram of the display device provided in FIG. 2. The display panel 12 is spaced apart from the light guide strip 14. A projection of the display panel 12 on the light guide strip 14 at least partially covers the light-exiting surface 142 of the light guide strip 14. A plane where the display panel 12 is located is away from the light-exiting surface 142 of the light guide strip 14 by a distance $H_1$. The distance $H_1$ satisfies: 0.3 mm≤H1≤0.5 mm. The plane where the display panel 12 is located and the light-exiting surface 142 of the light guide strip 14 define an angle θ therebetween. The angle θ satisfies: 15°≤θ≤30°.

The projection of the display panel 12 on the light guide strip 14 may be, but is not limited to, partially cover or completely cover the light-exiting surface 142 of the light guide strip 14. In one implementation, the projection of the display panel 12 on the light guide strip 14 may completely cover the light-exiting surface 142 of the light guide strip 14, such that the infrared light emitted by the light guide strip 14 can be completely incident on the display panel 12.

The distance $H_1$ may be a distance between a central point of the light-exiting surface 142 of the light guide strip 14 and the plane where the display panel 12 is located. The distance $H_1$ may be, but is not limited to, 0.3 mm, 0.4 mm, 0.5 mm, or the like. It can be understood that the distance $H_1$ may also be other values, as long as the distance $H_1$ satisfies: 0.3 mm≤$H_1$≤10.5 mm. The distance $H_1$ satisfies: 0.3 mm≤$H_1$≤0.5 mm, such that the infrared light emitted by the infrared light bead 15 is incident on a wider region of the display panel 12, thereby effectively enhancing the heating effect of the infrared light emitted by the infrared light bead 15 on the liquid crystal layer 121 of the display panel 12.

The plane where the display panel 12 is located and the light-exiting surface 142 of the light guide strip 14 define the angle θ therebetween, and the angle θ may be, but is not limited to, 15°, 20°, 25°, 30°, or the like. It can be understood that the angle θ may also be other angles, as long as the angle θ satisfies: 15°≤θ≤30°.

When the angle θ is greater than 15°, the infrared light mostly exits via the peripheral part of the display panel 12, and a central part of the display panel 12 is weakly heated. When the angle θ is greater than 30°, the infrared is mostly incident on the optical film 13, and the display panel 12 is weakly heated, such that the infrared light bead 15 needs higher power to realize a good heating effect. Therefore, in one implementation, the angle θ satisfies: 15°≤θ≤30°, so as to realize a comprehensive heating effect on the display panel 12, such that the infrared light emitted by the light guide strip 14 is incident on a wider region of the display panel 12, and the temperature of the liquid crystal layer 121 of the display panel 12 can rise rapidly.

Figure 12:
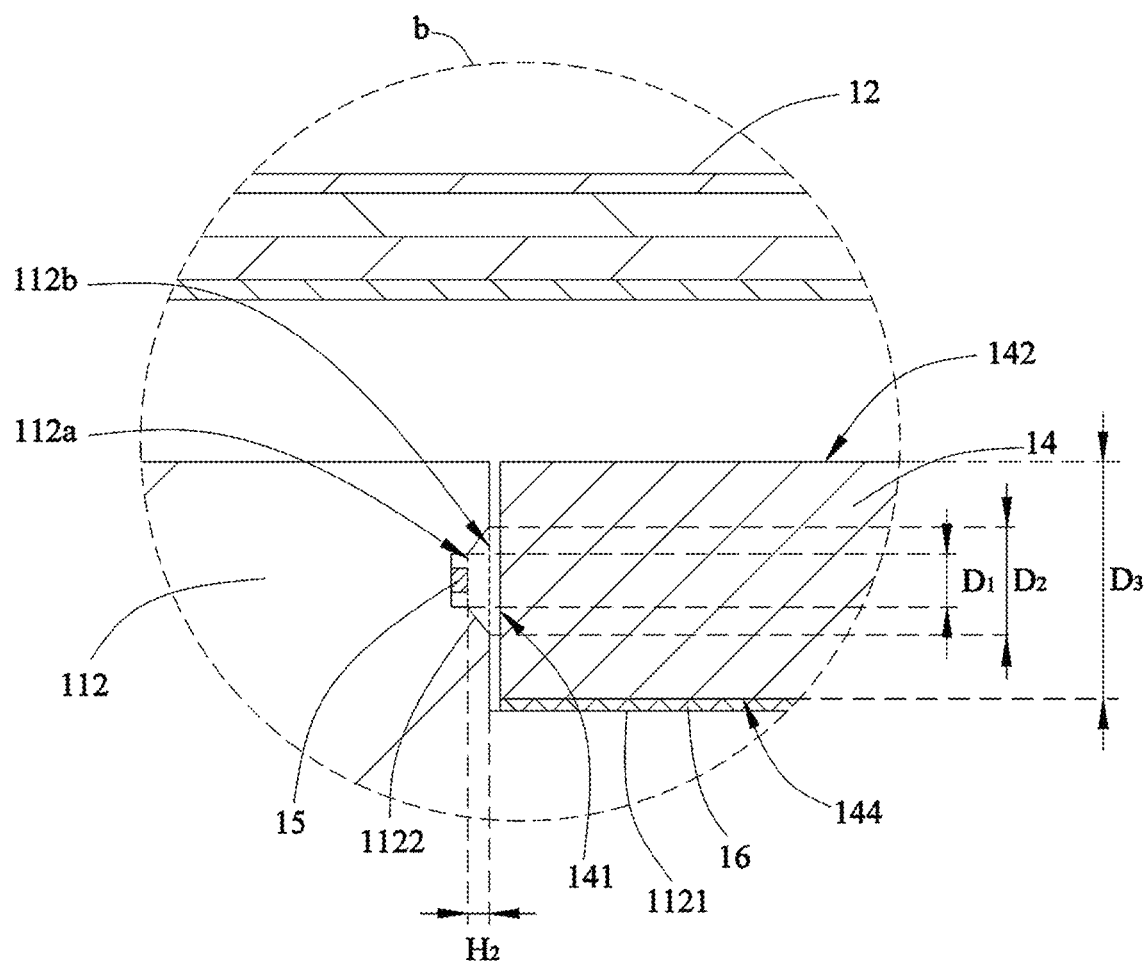
FIG. 12 is a partial enlarged schematic structural diagram of a display device in yet another implementation of the present disclosure.

Referring to FIG. 12, FIG. 12 is a partial enlarged schematic structural diagram of a display device in yet another implementation of the present disclosure. The second accommodating groove 1122 has a first end-surface 112a and a second end-surface 112b spaced apart from the first end-surface 112a. The first end-surface 112a is disposed close to the infrared light bead 15. The second end-surface 112b is disposed close to the first light-incident surface 141 of the light guide strip 14. The first end-surface 112a has a size $D_1$. The second end-surface 112b has a size $D_2$. The first light-incident surface 141 of the light guide strip 14 has a size $D_3$. The size $D_1$, the size $D_2$, and the size $D_3$ satisfy: $D_1 \leq D_2 \leq D_3$.

The first end-surface 112a may be, but is not limited to, spaced apart from the second end-surface 112b. The first end-surface 112a may be, but is not limited to, parallel to or substantially parallel to the second end-surface 112b. The first end-surface 112a is disposed close to the infrared light bead 15. In one implementation, the first end-surface 112a may, but is not limited to, directly face or partially face a light-exiting surface of the infrared light bead 15, such that the infrared light emitted by the infrared light bead 15 passes through the first end-surface 112a.

The second end-surface 112b may be, but is not limited to, attached to the first light-incident surface 141 of the light guide strip 14, such that the infrared light emitted by the infrared light bead 15 can comprehensively enter the light guide strip 14.

The first end-surface 112a has the size $D_1$. The size $D_1$ may be, but is not limited to, a distance between two points of the first end-surface 112a that are most spaced apart from each other in a first transverse direction. The first transverse direction may be, but is not limited to, parallel to or substantially parallel to a plane where the first end-surface 112a is located. The second end-surface 112b has the size $D_2$. The size $D_2$ may be, but is not limited to, a distance between two points of the second end-surface 112b that are most spaced apart from each other in a second transverse direction. The second transverse direction may be, but is not limited to, parallel or substantially parallel to a plane where the second end-surface 112b is located. The first light-incident surface 141 of the light guide strip 14 has the size $D_3$. The size $D_3$ may be, but is not limited to, a distance between two points of the first light-incident surface 141 that are most spaced apart from each other.

The size $D_1$ of the first end-surface 112a may be, but is not limited to, less than or equal to the size $D_2$ of the second end-surface 112b. The size $D_2$ of the second end-surface 112b may be, but is not limited to, less than or equal to the size $D_3$ of the third end-surface, that is, the size $D_2$ and the size $D_3$ satisfy: $D_2 \leq D_3$, such that the second accommodating groove 1122 has a trumpet-shaped, or similar trumpet-shaped design, which facilitates diffusion of the infrared light, makes more infrared light be emitted to the light guide strip 14, and reduces the waste of the infrared light. Therefore, the display panel 12 can be uniformly and efficiently heated with the limited number of infrared light beads 15.

Referring to FIG. 12 again, the first end-surface 112a is away from the second end-surface 112b by a distance $H_2$. The distance $H_2$ satisfies: 0.1 mm≤$H_2$≤0.2 mm.

The distance $H_2$ may be, but is not limited to, a distance between a central point of the first end-surface 112a and a central point of the second end-surface 112b. The distance $H_2$ may be, but is not limited to, 0.1 mm, 0.13 mm, 0.15 mm, 0.17 mm, or 0.2 mm. It can be understood that the distance $H_2$ may also be other values, as long as the distance $H_2$ satisfies: 0.1 mm≤$H_2$≤0.2 mm. The distance $H_2$ satisfies: 0.1 mm≤$H_2$≤0.2 mm, such that there is diffusion space for the infrared light emitted by the infrared light bead 15, and the infrared light emitted by the infrared light bead 15 can be uniformly diffused to the light guide strip 14, thereby making the infrared light emitted by the light guide strip 14 be incident on the display panel 12 more uniformly and comprehensively.

Referring to FIG. 2 and FIG. 6 again. The light guide strip 14 further has a bottom surface 144. The bottom surface 144 is connected to the first light-incident surface 141 in a bent manner, and the bottom surface 144 is opposite to the light-exiting surface 142. The display device 10 further includes a reflective strip 16. The reflective strip 16 is disposed at one side of the bottom surface 144 of the light guide strip 14 away from the light-exiting surface 142. The reflective strip 16 is configured to reflect the infrared light to the light guide strip 14.

The bottom surface 144 of the light guide strip 14 may be, but is not limited to, a flat surface, a curved surface, or an irregular surface. A bent angle between the bottom surface 144 and the first light-incident surface 141 may be, but is not limited to, 900 or about 90°. The reflective strip 16 may be, but is not limited to, made of a material having a function of reflecting infrared light. The reflective strip 16 is disposed at the side of the bottom surface 144 away from the light-exiting surface 142, and the reflective strip 16 may be, but is not limited to, attached to the bottom surface 144 of the light guide strip 14, such that the infrared light emitted to a surface of the reflective strip 16 is reflected to the light guide strip 14 again, thereby greatly improving the utilization efficiency of the infrared light. In addition, on the condition of relatively low costs, the light guide strip 14 can emit more infrared light, and a rate at which the display panel 12 is heated is increased, such that the display panel 12 can rapidly get to operate normally in the low-temperature environment.

Figure 13:
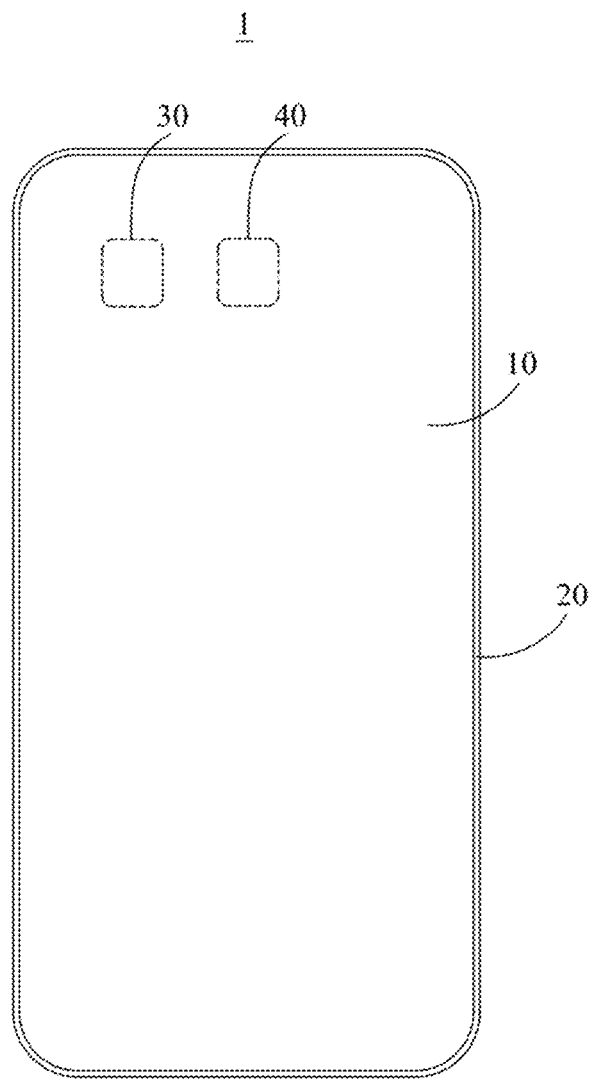
FIG. 13 is a schematic diagram of an electronic device in implementation of the present disclosure.

Referring to FIG. 13, FIG. 13 is a schematic diagram of an electronic device in implementations of the present disclosure. An electronic device 1 is further provided in the present disclosure. The electronic device 1 includes a housing 20 and the display device 10 in any of the above implementations of the present disclosure. The housing 20 is configured to accommodate the display device 10.

The electronic device 1 may be, but is not limited to, a smart phone, a portable phone, a navigation device, a Television (TV), an in-vehicle head unit, a laptop computer, a tablet computer, a Portable Multimedia Player (PMP), a Personal Digital Assistant (PDA), and other devices having a display function.

The housing 20 may be, but is not limited to, made of plastic, metal, composite materials, or the like. The housing 20 may be, but is not limited to, configured to accommodate and carry the display device 10.

The electronic device 1 may include, but is not limited to, a sensor 30 and a control chip 40. The sensor 30 may be, but is not limited to, configured to detect a temperature of the display panel 12. The sensor 30 may be, but is not limited to, configured to sense the temperature of the display panel 12 through a pin or other temperature detection assemblies. The sensor 30 may further include any other functional devices capable of sensing the temperature, such as a thermistor, etc. It can be understood that structural composition of the sensor 30 should not be construed as a limitation to the electronic device 1 provided in this implementation. The sensor 30 is configured to sense the temperature of the display panel 12 and obtain a feedback signal. The feedback signal may be, but is not limited to, a current signal, a voltage signal, or the like.

The control chip 40 may be, but is not limited to, electrically connected to the sensor 30 through a pin, an adapter circuit board, etc. The control chip 40 is electrically connected to the sensor 30 and receives the feedback signal. The control chip 40 may be, but is not limited to, configured to calculate a temperature specifically identified by the sensor 30 according to the feedback signal. The control chip 40 may be, but is not limited to, configured to store a preset temperature threshold. When the temperature of the display panel 12 identified by the sensor 30 is greater than the preset temperature threshold, the control chip 40 may be, but is not limited to, configured to output a second control signal and control the infrared light bead 15 to be turned off. When the temperature of the display panel 12 identified by the sensor 30 is less than or equal to the preset temperature threshold, the control chip 40 may be, but is not limited to, configured to output a first control signal and control the infrared light bead 15 to be turned on. When the infrared light bead 15 is turned on, infrared light is emitted to the display panel 12 to heat the display panel 12, thereby ensuring normal operation of the display panel 12.

In an implementation of the present disclosure, a first preset value may be, but is not limited to, a preset temperature threshold. The preset temperature threshold may be, but is not limited to, 5° C., 0° C., −5° C., −10° C., −20° C., or the like. It can be understood that the preset temperature threshold can also be adjusted according to different actual application scenarios of the electronic device 1 and experimental simulation calculation. A specific value of the preset temperature threshold should not be construed as a limitation to the electronic device 1 provided in this implementation.

When the sensor 30 senses that the temperature of the display panel 12 is less than the first preset value, the sensor 30 may be, but is not limited to, configured to transmit a first feedback signal to the control chip 40, and the control chip 40 may be, but is not limited to, configured to calculate a temperature specifically identified by the sensor 30 according to the first feedback signal. The control chip 40 may be, but is not limited to, configured to store a preset temperature threshold. When the temperature of the display panel 12 identified by the sensor 30 is less than the first preset value, the control chip 40 may be, but is not limited to, configured to output a first control signal and control the infrared light bead 15 to be turned on.

The sensor 30 may, but is not limited to, configured to sense the temperature of the display panel 12 again and transmit a second feedback signal to the control chip 40. The control chip 40 can determine, according to the second feedback signal, whether the temperature of the display panel 12 has already been greater than or equal to the first preset value. When the control chip 40 determines that the temperature of the display panel 12 is still less than the first preset value, the control chip 40 may be, but is not limited to, configured not to transmit a control signal. In other words, the control 40 is configured to keep the infrared light bead 15 on, and control the sensor 30 to repeatedly sense the temperature of the display panel 12 until the control chip 40 determines that the temperature of the display panel 12 is greater than the first preset value.

When the control chip 40 determines that the temperature of the display panel 12 is greater than the first preset value, the control chip 40 is configured to output a second control signal and control the infrared light bead 15 to be turned off. Therefore, an operating temperature of the display panel 12 is accurately controlled, and the display panel 12 is ensured to normally operate.

In an implementation of the present disclosure, when an infrared light-emitting assembly (e.g., the infrared light bead 15) is turned on, the sensor 30 may be, but is not limited to, configured to sense the temperature of the display panel 12 in real time and obtain a third feedback signal. The control chip 40 may be, but is not limited to, configured to calculate to obtain a temperature rise rate of the display panel 12 according to the third feedback signal. The control chip 40 may be, but is not limited to, configured to store a second preset value. The second preset value may be, but is not limited to, a temperature-rise-rate threshold. When the temperature rise rate of the display panel 12 is less than the second preset value, the control chip 40 can output a third control signal and control the infrared light-emitting assembly to increase operating power of the infrared light-emitting assembly. When the temperature rise rate of the display panel 12 is greater than the second preset value, the control chip 40 can output a fourth control signal and control the infrared light-emitting assembly to reduce the operating power of the infrared light-emitting assembly.

In a fifth implementation of the present disclosure, when the infrared light-emitting assembly is turned on, the sensor 30 may be, but is not limited to, configured to sense the temperature of the display panel 12 in real time and obtain a fourth feedback signal. The control chip 40 may be, but is not limited to, configured to calculate to obtain the temperature of the display panel 12 according to the fourth feedback signal. The control chip 40 may be, but is not limited to, configured to store a third preset value. The third preset value may include, but is not limited to, a first temperature range, a second temperature range, . . . , and an Nth temperature range. When the temperature of the display panel 12 is in different temperature ranges, the control chip 40 can output a fifth control signal and control the infrared light-emitting assembly to operate at different power. For example, when the temperature of the display panel 12 is in a relatively low temperature range, the infrared light-emitting assembly can be selectively controlled to operate at relatively high power. When the temperature of the display panel 12 is in a relatively high temperature range, the infrared light-emitting assembly can be selectively controlled to operate at relatively low power. Therefore, a potential safety hazard caused by continuous temperate rise of the display panel 12 after the infrared light-emitting assembly is turned off is avoided, and the operating temperature of the display panel 12 is accurately controlled, which ensures that the display panel 12 and the electronic device 1 can safely and normally operate.

The term "embodiment" or "implementation" referred to herein means that particular features, structures, or characteristics described in conjunction with implementations may be defined in at least one implementation of the present disclosure. The phrase "implementation" appearing in various places in the specification does not necessarily refer to the same implementation or an independent or alternative implementation that is mutually exclusive with other implementations. Those skilled in the art will understand expressly and implicitly that an implementation described herein may be combined with other implementations. In addition, it should also be understood that the features, structures, or characteristics described in implementations of the present disclosure may be arbitrarily combined without contradiction, so as to form another implementation without departing from the spirit and scope of technical solutions of the present disclosure.

Finally, it should be noted that the above implementations are only used to illustrate the technical solutions of the present disclosure rather than limit. Although the present disclosure is illustrated in detail with reference to the above preferred implementations, those of ordinary skill in the art should understand that, any modification or equivalent replacement of the technical solutions of the present disclosure should not depart from the spirit and scope of the technical solutions of the present disclosure.

What is claimed is:

1. A display device, comprising:
   a back plate;
   a display panel carried on the back plate and comprising a liquid crystal layer;
   an optical film disposed at one side of the display panel adjacent to the back plate;
   a light guide strip having a first light-incident surface and a light-exiting surface, wherein the first light-incident surface is connected to the light-exiting surface in a bent manner; and
   an infrared light bead accommodated in the back plate, wherein the infrared light bead is configured to emit infrared light, the infrared light bead is disposed close to the first light-incident surface of the light guide strip, the infrared light emitted by the infrared light bead enters the light guide strip via the first light-incident surface of the light guide strip, and exits the light guide strip via the light-exiting surface, and the infrared light emitted from the light-exiting surface at least partially avoids the optical film and is incident on the liquid crystal layer of the display panel, to heat the liquid crystal layer of the display panel.

2. The display device of claim 1, wherein the back plate comprises:
   a body portion; and
   a frame portion connected to a periphery of the body portion in a bent manner, wherein the frame portion defines a first accommodating groove and a second accommodating groove communicating with the first accommodating groove, the light guide strip is disposed in the first accommodating groove, and the infrared light bead is disposed in the second accommodating groove.

3. The display device of claim 2, wherein the frame portion comprises a first frame sub-portion, a second frame sub-portion, and a connecting portion, the first frame sub-portion is configured to carry the optical film, and the second frame sub-portion is configured to carry the display panel, the connecting portion is connected between the first frame sub-portion and the second frame sub-portion, the connecting portion has a connecting surface away from the body portion, the connecting surface is inclined in a direction away from a periphery of the display panel, the first accommodating groove is defined in the connecting portion, and an opening of the first accommodating groove is located on the connecting surface.

4. The display device of claim 2, wherein the light guide strip further has a second light-incident surface, wherein the second light-incident surface is connected to the light-exiting surface in a bent manner, and is opposite to the first light-incident surface; and
   the infrared light bead is implemented as a plurality of infrared light beads, some infrared light beads in the plurality of infrared light beads are disposed close to the first light-incident surface, infrared light emitted by said some infrared light beads enters the light guide strip via the first light-incident surface, the other infrared light beads in the plurality of infrared light beads are disposed close to the second light-incident surface, and infrared light emitted by the other infrared light beads enters the light guide strip via the second light-incident surface.

5. The display device of claim 4, wherein the frame portion is implemented as a plurality of frame portions, and the light guide strip is implemented as a plurality of light guide strips; and
   the plurality of frame portions each are at least provided with one of the plurality of light guide strips and two of the plurality of infrared light beads correspondingly, one of the two infrared light beads is disposed close to the first light-incident surface of the light guide strip, and the other of the two infrared light beads is disposed close to the second light-incident surface of the light guide strip.

6. The display device of claim 2, wherein the second accommodating groove has a first end-surface and a second end-surface spaced apart from the first end-surface, the first end-surface is disposed close to the infrared light bead, the second end-surface is disposed close to the first light-incident surface of the light guide strip, the first end-surface has a size $D_1$, the second end-surface has a size $D_2$, the first light-incident surface of the light guide strip has a size $D_3$, and the size $D_1$, the size $D_2$, and the size $D_3$ satisfy: $D_1 \leq D_2 \leq D_3$.

7. The display device of claim 6, wherein the first end-surface is away from the second end-surface by a distance $H_2$, and the distance $H_2$ satisfies: $0.1 \text{ mm} \leq H_2 \leq 0.2 \text{ mm}$.

8. The display device of claim 1, wherein the display panel is spaced apart from the light guide strip, a projection of the display panel on the light guide strip at least partially covers the light-exiting surface of the light guide strip, a plane where the display panel is located is away from the light-exiting surface of the light guide strip by a distance $H_1$, and the distance $H_1$ satisfies: $0.3 \text{ mm} \leq H_1 \leq 0.5 \text{ mm}$; and
   the plane where the display panel is located and the light-exiting surface of the light guide strip define an angle $\theta$ therebetween, and the angle $\theta$ satisfies: $15° \leq \theta \leq 30°$.

9. The display device of claim 1, wherein the light guide strip further has a bottom surface, the bottom surface is connected to the first light-incident surface in a bent manner, and the bottom surface is opposite to the light-exiting surface; and the display device further comprises a reflective strip, the reflective strip is disposed at one side of the bottom surface of the light guide strip away from the light-exiting surface, and the reflective strip is configured to reflect the infrared light to the light guide strip.

10. An electronic device, comprising a housing and a display device, wherein the display device comprises:
a back plate;
a display panel carried on the back plate and comprising a liquid crystal layer;
an optical film disposed at one side of the display panel adjacent to the back plate;
a light guide strip having a first light-incident surface and a light-exiting surface, wherein the first light-incident surface is connected to the light-exiting surface in a bent manner; and
an infrared light bead accommodated in the back plate, wherein the infrared light bead is configured to emit infrared light, the infrared light bead is disposed close to the first light-incident surface of the light guide strip, the infrared light emitted by the infrared light bead enters the light guide strip via the first light-incident surface of the light guide strip, and exits the light guide strip via the light-exiting surface, and the infrared light emitted from the light-exiting surface at least partially avoids the optical film and is incident on the liquid crystal layer of the display panel, to heat the liquid crystal layer of the display panel, wherein
the housing is configured to accommodate the display device.

11. The electronic device of claim 10, wherein the back plate comprises:
a body portion; and
a frame portion connected to a periphery of the body portion in a bent manner, wherein the frame portion defines a first accommodating groove and a second accommodating groove communicating with the first accommodating groove, the light guide strip is disposed in the first accommodating groove, and the infrared light bead is disposed in the second accommodating groove.

12. The electronic device of claim 11, wherein the frame portion comprises a first frame sub-portion, a second frame sub-portion, and a connecting portion, the first frame sub-portion is configured to carry the optical film, and the second frame sub-portion is configured to carry the display panel, the connecting portion is connected between the first frame sub-portion and the second frame sub-portion, the connecting portion has a connecting surface away from the body portion, the connecting surface is inclined in a direction away from a periphery of the display panel, the first accommodating groove is defined in the connecting portion, and an opening of the first accommodating groove is located on the connecting surface.

13. The electronic device of claim 11, wherein the light guide strip further has a second light-incident surface, wherein the second light-incident surface is connected to the light-exiting surface in a bent manner, and is opposite to the first light-incident surface; and
the infrared light bead is implemented as a plurality of infrared light beads, some infrared light beads in the plurality of infrared light beads are disposed close to the first light-incident surface, infrared light emitted by said some infrared light beads enters the light guide strip via the first light-incident surface, the other infrared light beads in the plurality of infrared light beads are disposed close to the second light-incident surface, and infrared light emitted by the other infrared light beads enters the light guide strip via the second light-incident surface.

14. The electronic device of claim 13, wherein the frame portion is implemented as a plurality of frame portions, and the light guide strip is implemented as a plurality of light guide strips; and
the plurality of frame portions each are at least provided with one of the plurality of light guide strips and two of the plurality of infrared light beads correspondingly, one of the two infrared light beads is disposed close to the first light-incident surface of the light guide strip, and the other of the two infrared light beads is disposed close to the second light-incident surface of the light guide strip.

15. The electronic device of claim 11, wherein the second accommodating groove has a first end-surface and a second end-surface spaced apart from the first end-surface, the first end-surface is disposed close to the infrared light bead, the second end-surface is disposed close to the first light-incident surface of the light guide strip, the first end-surface has a size $D_1$, the second end-surface has a size $D_2$, the first light-incident surface of the light guide strip has a size $D_3$, and the size $D_1$, the size $D_2$, and the size $D_3$ satisfy: $D_1 \leq D_2 \leq D_3$.

16. The electronic device of claim 15, wherein the first end-surface is away from the second end-surface by a distance $H_2$, and the distance $H_2$ satisfies: $0.1 \text{ mm} \leq H_2 \leq 0.2 \text{ mm}$.

17. The electronic device of claim 10, wherein the display panel is spaced apart from the light guide strip, a projection of the display panel on the light guide strip at least partially covers the light-exiting surface of the light guide strip, a plane where the display panel is located is away from the light-exiting surface of the light guide strip by a distance $H_1$, and the distance $H_1$ satisfies: $0.3 \text{ mm} \leq H_1 \leq 0.5 \text{ mm}$; and
the plane where the display panel is located and the light-exiting surface of the light guide strip define an angle $\theta$ therebetween, and the angle $\theta$ satisfies: $15° \leq \theta \leq 30°$.

18. The electronic device of claim 10, wherein the light guide strip further has a bottom surface, the bottom surface is connected to the first light-incident surface in a bent manner, and the bottom surface is opposite to the light-exiting surface; and
the display device further comprises a reflective strip, the reflective strip is disposed at one side of the bottom surface of the light guide strip away from the light-exiting surface, and the reflective strip is configured to reflect the infrared light to the light guide strip.

19. The electronic device of claim 10, further comprising a sensor and a control chip, wherein the sensor is configured to detect a temperature of the display panel, and the control chip is electrically connected to the sensor.

20. The electronic device of claim 19, wherein the control chip is configured to store a preset temperature threshold, the control chip is configured to output a first control signal and control the infrared light bead to be turned on when the temperature of the display panel is less than or equal to the preset temperature threshold, and the control chip is configured to output a second control signal and control the infrared light bead to be turned off when the temperature of the display panel is greater than the preset temperature threshold.

* * * * *